United States Patent [19]
deMey, II

[11] Patent Number: 4,603,835
[45] Date of Patent: Aug. 5, 1986

[54] SHUTTER MECHANISM

[75] Inventor: Charles F. deMey, II, West Redding, Conn.

[73] Assignee: The Perkin-Elmer Corporation, Norwalk, Conn.

[21] Appl. No.: 549,952

[22] Filed: Nov. 9, 1983

[51] Int. Cl.[4] .............................................. F16K 31/44
[52] U.S. Cl. .................... 251/215; 251/187; 251/229; 251/300; 49/41; 74/96
[58] Field of Search ................ 251/56, 187, 215, 229, 251/300; 49/41, 209; 74/96

[56] References Cited

U.S. PATENT DOCUMENTS

| 521,832 | 6/1894 | Stone | 251/300 X |
|---|---|---|---|
| 3,343,562 | 9/1967 | Combes | 137/315 |
| 3,521,665 | 7/1970 | Poulsen | 137/383 |
| 4,062,515 | 12/1977 | Bobo | 251/167 |

FOREIGN PATENT DOCUMENTS 180936  1/1907  Fed. Rep. of Germany ...... 251/300

Primary Examiner—Margaret A. Focarino
Assistant Examiner—Allen J. Flanigan
Attorney, Agent, or Firm—F. L. Masselle; E. T. Grimes

[57] ABSTRACT

A shutter mechanism which includes simultaneous translation of a shutter in two planes of motion prolongs the life of the sealing material of the shutter as well as ensures that, when open, an optical beam passes through a sample compartment without interference or disruption. A further advantage of such a mechanism lies in the positive sealing of a port with sufficient pressure applied via the shutter plate to prevent vapor or fluid communication across the port.

11 Claims, 10 Drawing Figures

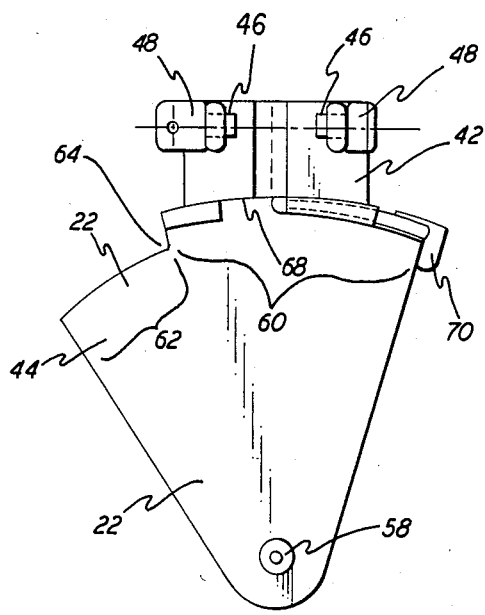
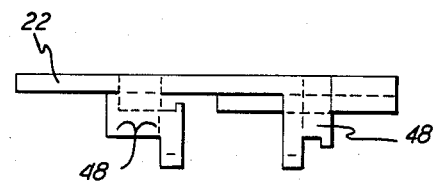
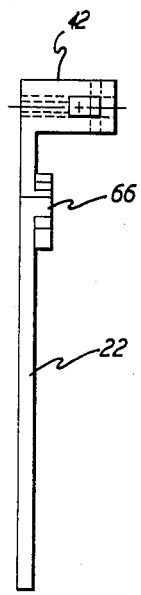
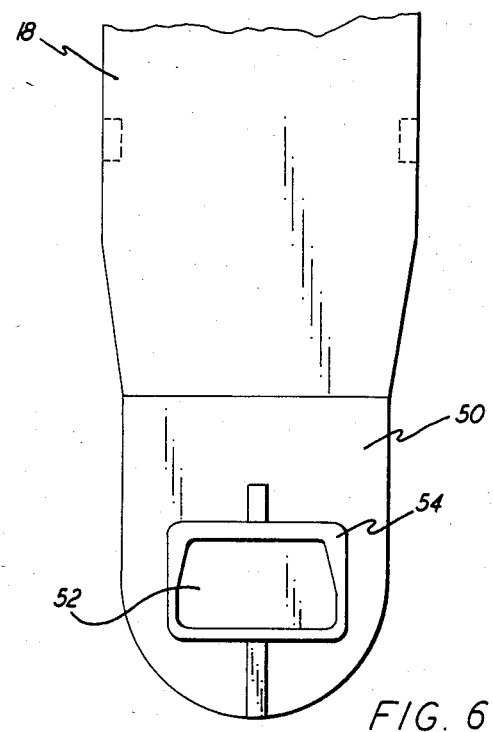

SHUTTER MECHANISM

BACKGROUND OF THE INVENTION

The present invention relates generally to a shutter mechanism for automatically opening and closing a port and, in particular, relates to a shutter mechanism which ensures that the sealing/unsealing movement and the rotational movement of a shutter are mutually independent.

The need to control gas or moisture passing through a port is widespread. One specific application where such a requirement is in demand is in analytical instrument, e.g., an infrared spectrophotometer In many analytical instruments a compartment containing the optical elements of the instrument is purged with an inert gas to maintain an optimum ambient for IR transmission a well as to protect the optical surfaces from condensation, contamination or other degrading effects. During such purging the sample compartment is often contaminated by gas or moisture leaks. It is imperative to maintain the sample compartment of an analytical instrument, particularly a sensitive analytical instrument, as clean as possible.

It is known in the art and, in particular, in the analytical instrument field, to seal the ports to the sample compartment during the period of time that the optical compartment is opened or undergoing a purging. This can be accomplished by many mechanisms, such as, for example, sealing the port with tape or with a sponge-like material. However, such techniques provide either insufficient seals or contaminate the sample compartment in and by themselves.

One analytical instrument which is extremely sensitive to the type of problem discussed above is a Fourier Transform Infrared (FT/IR) spectrophotometer. In such an instrument the sample compartment is isolated from the remainder of the instrument except for two ports through which the light beam passes through the sample. Because of the high sensitivity of such a spectrophotometer the cleanliness of the sample compartment is crucially important. To date, conventional techniques used to seal the beam path openings on either side of a sample compartment generally suffer from such difficulties as, for example, short lifetime, failure to seal sufficiently, or the like.

SUMMARY OF THE INVENTION

Accordingly, it is one object of the present invention to provide a shutter mechanism which can open and sealingly close a port in a reliable repeatable manner.

This object is achieved, at least in part, by a shutter mechanism the sealing face of which is displaceable in two different planes and which is adapted so that simultaneous movement in both planes is excluded.

Other objects and advantages will become apparent to those skilled in the art from the following detailed description read in conjunction with the appended claims and the drawing attached hereto.

BRIEF DESCRIPTION OF THE DRAWING

The drawing, not drawn to scale, includes:

FIGS. 5A-5C are front, top and side views of another element (22) of the shutter mechanisms shown in FIG. 1; and FIG. 6 is a detailed view of a portion of the shutter arm (18) shown in FIG. 1.

DETAILED DESCRIPTION OF THE INVENTION

Figure 2:
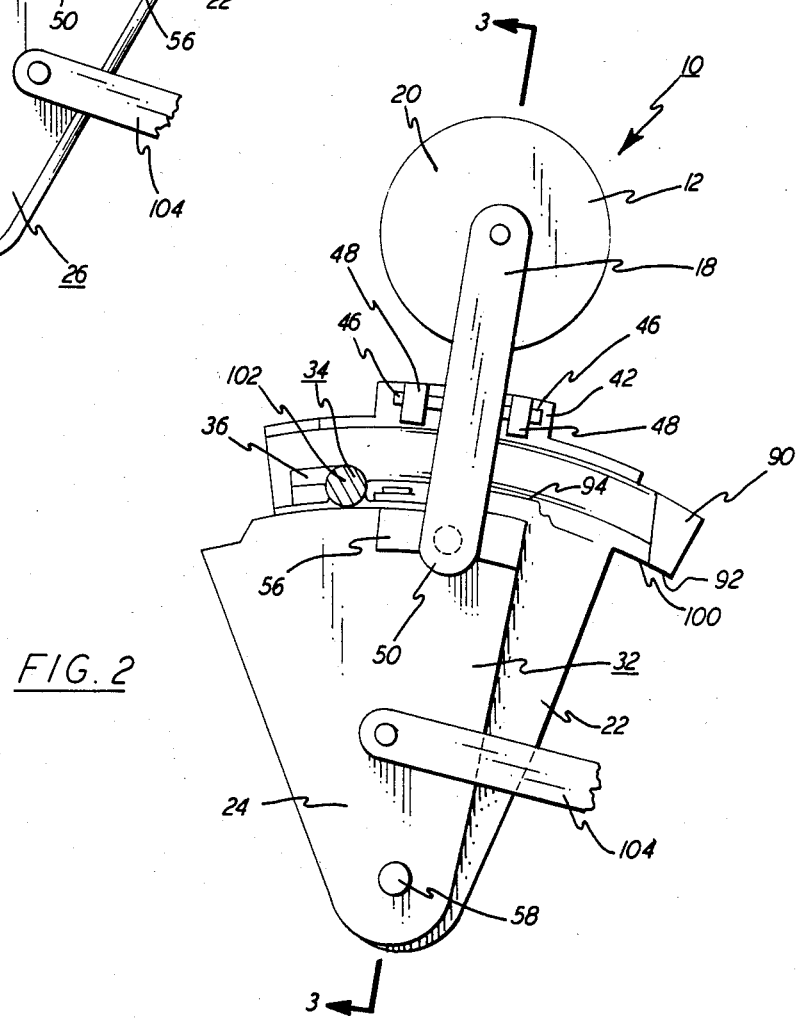
FIG. 2 which is a plan view of the shutter mechanism shown in FIG. 1 but wherein the shutter is at an intermediate sealing position.
Figure 3:
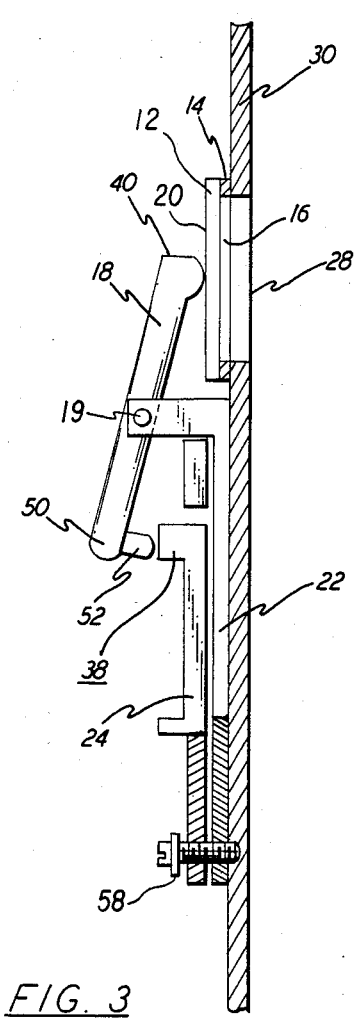
FIG. 3 which is a cross-sectional view of the shutter mechanism shown in FIG. 2 taken along the line 3—3 thereof.

A shutter mechanism, generally indicated at 10 in the drawing and embodying the principles of the present invention, includes a shutter plate 12 having an annulus 14 of resilient sealing material affixed to one face 16 thereof (FIG. 3). The opposite face 20 of plate 12 is affixed to one end 40 of a shutter arm 18 by means of a universal joint as hereinafter described. The shutter mechanism 10 also includes a shutter arm carrier plate 22 to which the shutter arm 18 is pivotably affixed, as at 19 a manner also hereinafter described. Further included in mechanism 10 is a shutter control member 24 rotatable between a first position 26 (FIG. 1), whereat a port 28 through a wall 30, e.g., a sample compartment wall, is fully opened, and a second position 32 (FIG. 2), whearat the port 28 is sealed by the shutter plate 12. The mechanism 10 further includes a means 34 for interlocking the shutter arm carrier plate 22 with the shutter control member 24 only during a first portion of the distance rotated between the first position and the second position. In addition, the shutter mechanism 10 includes a means 36 for releasing the shutter arm carrier plate 22 from the shutter control member 24 during a second portion of the distance rotated between the first position and the second position. Still further, the shutter mechanism 10 includes means 38 for pivoting the shutter arm 18 only during the second portion of the total distance rotated between the first position and the second position.

Figure 1:
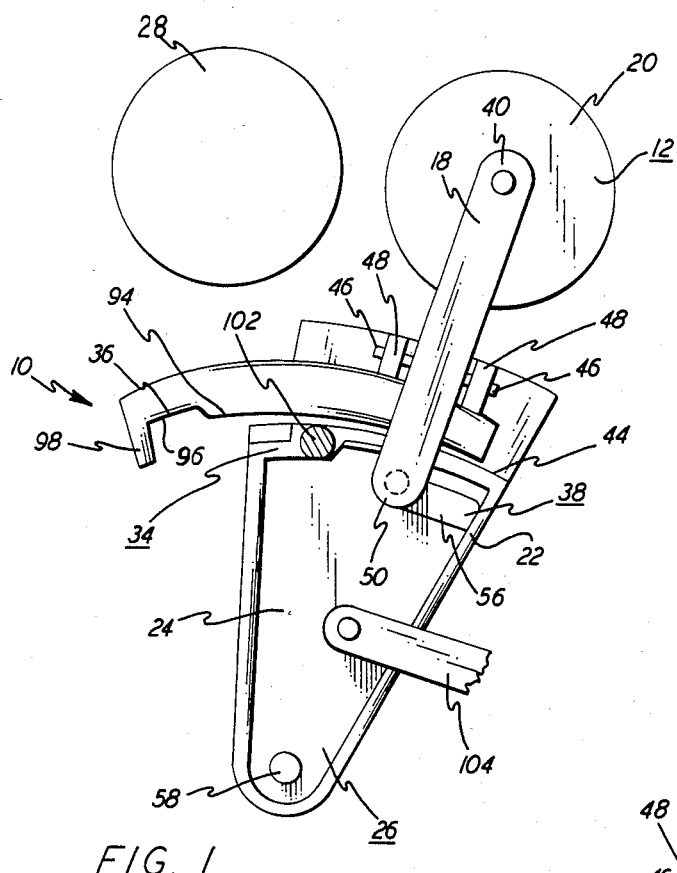
FIG. 1 which is a plan view of a shutter mechanism, embodying the principles of the present invention, in a fully opened position.

In one preferred embodiment, the mechanism 10 is located within the optical compartment of a Fourier Transform Infrared (FT/IR) spectrophotometer adjacent the sample compartment wall 30. A number of ports 28, only one of which is shown in FIG. 1, through the wall 30 are about 40 mm in diameter and are situated to allow the incident IR radiation beam to enter and exit the sample compartment.

The shutter plate 12, in one embodiment, has an outside diameter of about 5 centimeters, and the annulus 14 of sealing material, e.g., plastic foam, is affixed to the face 16 thereof, has a thickness of about 0.3 centimeters and an outside radius of about 2.5 centimeters. The shutter plate 12 is connected to one end 40 of the shutter arm 18 by means of, for example, a ball and socket joint which allows uniform pressure to be applied against the wall 30 by the shutter plate 12 when in the closed position.

The shutter arm 18 is pivotably secured to the shutter arm carrier plate 22. As best appears in FIG. 5A, shutter arm carrier plate 22 is generally formed in the shape of a circular sector and includes a tab 42, preferably rectangular, extending from the sector arc 44 away from the pivot point. The shutter arm 18 is secured between a pair of pins 46 about which it can rotate, which pins are affixed to a pair of blocks 48 protruding from the tab 42. Referring to FIG. 6, the other end 50 of the arm 18, in the preferred embodiment, carries a roller bearing 52 which is in the shape of a cone segment. The bearing 52 rotates in an opening 54 in end 50 of the arm 18 and protrudes slightly therefrom. As more fully discussed below, the bearing 52 acts in conjunction with a ramp 56 protruding from the shutter control member 24 to cause end 40 of the shutter arm 18 to pivot toward the wall 30.

The shutter arm carrier plate 22, shown in FIGS. 5A through 5C, is rotatably affixed to the sample compartment wall 30. In the preferred embodiment, the shutter arm carrier plate 22 is a sector having an included angle of 70 degrees and bounded by radii of about 6 centimeters. The shutter arm carrier plate 22 rotates about a point 58 which is located along a radius bisecting the included angle. The sector arc 44 includes a first portion 60 of about 45 degrees and a second portion 62 of about 25 degrees. The first portion 60 is bounded by radii of about 6 centimeters and the second portion 62 is bounded by radii of about 5 centimeters. The first portion 60 and the second portion 62 interface near the arc periphery to form a first notch 64. The first portion 60 of the carrier plate 22 includes a protruding rim 66 along the arc thereof which rim 66 includes a gap 68 therein. In the preferred embodiment, the protruding rim 66 includes a rim extension 70 extending along the sector boundary radius downwardly away from the arc 44. Preferably, the rim extension 70 extends along the radius a distance of about 1 centimeter. As more fully discussed below, the rim extension 70 serves as part of the means 34 for interlocking the shutter arm carrier plate 22 and the shutter control member 24.

Figure 4A:
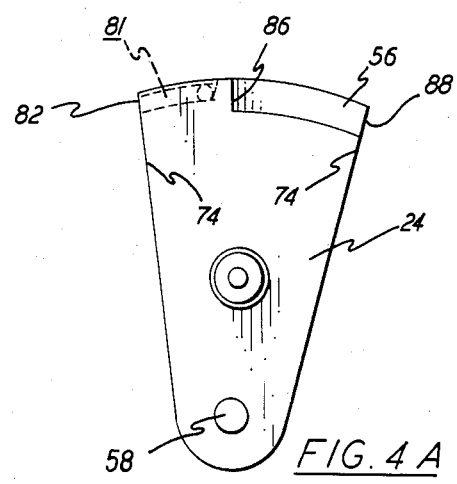
FIGS. 4A-4C are front, side and top views of one element (24) in the shutter mechanism shown in FIG. 1.
Figure 4B:
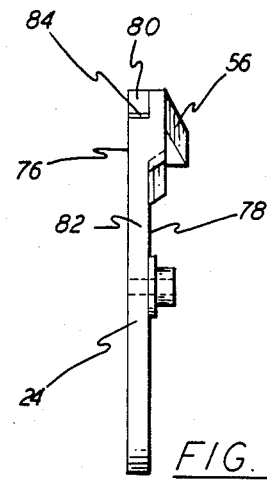
Figure 4C:
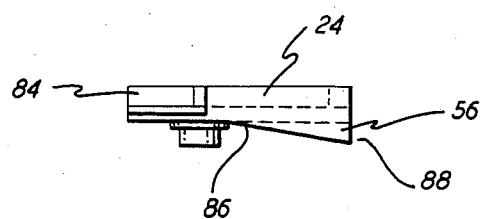

The shutter control member 24, shown in FIGS. 4A through 4C, is rotatably affixed to the sample compartment wall 30 and spaced apart therefrom by the shutter carrier plate 22. Preferably, the shutter control member 24 is also a sector having an included angle of about 30 degrees and bounded by radial edges 74 of about 5.5 centimeters in length. The shutter control member 24 rotates about point 58 on a radius bisecting the included angle. In the preferred embodiment, the shutter control member 24 and the shutter arm carrier plate 22 rotate about a common axis at point 58. The shutter control member 24 has a first surface 76 proximate the wall 30 and an opposing surface 78 generally parallel to and spaced apart from the first surface 76. Preferably, the shutter control member 24 is about 1 centimeter thick. Surface 76 includes an indentation 80 therein which extends into the first surface 76 to a depth of about 0.3 centimeters and arcuately extends from one edge 82 of the member 24 about 14 degrees. The indentation 80, forming a segment 81 of the sector, uniformly extends away from the sector arc 74 about 0.25 centimeters to provide a release track 84. The member 24 further includes the shutter arm engaging ramp 56 protruding from the second face 78 thereof. The ramp 56 extends about 15 degrees arcuately and rises from a zero depth at one end 86 to a thickness of about 0.4 centimeters at the other end 88. Preferably, the other end 88 of the ramp 56 co-terminates with the radius of the sector distal the indentation 80.

For reasons more fully explained below, a retainer plate 90 is provided and affixed to the wall 30. The retainer plate 90 is affixed such that the tab 42 of the shutter arm carrier plate 22 extends above the outer peripheral edge 92 thereof. Additionally, sufficient clearance is provided to allow the carrier plate 22 to rotate. The retainer plate 90 includes an arcuate track 94 which is substantially uniformly spaced apart from the protruding rim 66 of the shutter carrier plate 22. The track 94 includes an interlocking means receiving notch 96 therein having an arcuate length of about 15 degrees and a depth of about 0.2 centimeters. The track 94 includes a downwardly protruding stop 98 at one end thereof proximate the notch 96. In one embodiment, the retainer plate 90 includes an overhanging lip 100, which is, for clarity, shown in cutaway only in FIG. 2, and which, for reasons more fully explained below, overhangs the shutter control member 24.

All the components of the mechanism 10 can be formed using the conventional manufacturing techniques. Preferably the parts hereof are formed 40% carbon fiber filled polyphenelene sulfide except for the conical bearing 52 which is preferably formed from acetal.

In operation, a disk 102, having a diameter on the order of about 0.65 centimeters and a thickness on the order of about 0.3 centimeters, effectively constitutes the interlocking means 34. The disk 102 is positioned in the notch 64 in the shutter control member 24 and projects into the gap 68 in the protruding rim 66 of the sample carrier plate 22 during the rotation of the shutter control member 24 through the first portion of the complete distance of its travel. The shutter control member 24 is affixed to a movable arm 104 which causes it to rotate about its pivot point 58. In the preferred embodiment, the moveable arm 104 is controlled by a pneumatic piston although other forms of movement such as a reciprocating motor or the like could also be used.

As shown in FIG. 1, which represents the shutter mechanism 10 being in the fully opened position, the disk 102 is retained between the indentation 80 in the shutter control member 24 and in the gap 68 of the shutter carrier plate 22. Thus, when the control member 24 is urged to rotate by the moving arm 104, the shutter carrier plate 22 is carried therewith. The member 24 and the plate 22 remain interlocked until the notch 96 in the retainer plate 90 is reached whereupon the downwardly protruding edge 98 of the retainer plate 90 stops any further rotation of the shutter carrier member 22. The disk 102 is, at that point in time, aligned with the notch 96 extending into the retainer plate 90 and is pushed thereinto by the continued rotation of the shutter control member 24. As a consequence, the control member 24 is allowed to continue its rotation whereas the shutter carrier member 22 is retained in position. Simultaneously with the singular continued motion of the shutter control member 24, the conical bearing 52 of the shutter arm 18 contacts the ramp 56 protruding from the second surface 78 of the control member 24 and, as the rotation continues, pivots the shutter plate 12 toward the port 28. As a consequence, when the control member 24 is in its second position, i.e., the fully closed position, the conical bearing 52 is at approximately the maximum height of the ramp 56 thereby providing maximum force to the shutter plate 12 against the wall 30 about the port 28.

As shown in FIG. 2, during the second portion of the rotation of the control member 24, the disk 102 is secured in the notch 96 of the retainer plate 90 by the outer peripheral arc 74 of the control member 24.

When the port 28 is to be opened, the control member 24 is rotated clockwise to thereby remove the ramp 56 from underneath the conical bearing 52 and allow the shutter plate 12 to move away from the port 28. At this stage, i.e. once the conical bearing 52 is released from the ramp 56, the disk 102 moves through the gap 68 of the protruding rim 66 carrier plate 22 into the indentation 80 of the control member 24. Simultaneously, the control member 24 contacts the rim extension 70 protruding downwardly along the radius of the carrier plate 22 and causes the carrier plate 22 to rotate with the control member 24.

The present invention has been described herein by means of a specific exemplary embodiment. Other configurations and arrangements may be made by persons skilled in the art without departing from the spirit and scope of the present invention which is considered defined only by the appended claims and the reasonable interpretation thereof.

What is claimed is:

1. A shutter mechanism comprising:
   a shutter control member;
   means for rotating said shutter control member between a first position and a second position;
   a shutter carrier plate;
   means for interlocking said shutter carrier plate with said shutter control member during a first portion of the rotation of said member between said first and said second position;
   means for releasing said shutter carrier plate from said shutter control member during a second portion of said rotation between said first and said second positions;
   a shutter plate, said shutter plate being pivotable in a plane different than the rotation plane of said shutter control member; and
   means for engaging said shutter plate with said shutter control member during said second portion of said rotation of said member during which said shutter plate is pivoted against a wall whereby a port can be covered.

2. Shutter mechanism as claimed in claim 1 wherein said shutter control member is a sector having an arcuate edge, a first portion of which lies at a given radius from the axis of rotation of said member, and having a second, indented portion adjacent said first portion which lies at a lesser radius from said axis than said first portion.

3. Shutter mechanism as claimed in claim 1 wherein said shutter control member is a sector having an arcuate edge and having an indentation which is of uniform depth with respect to the circle in which said arcuate edge lies.

4. Shutter mechanism as claimed in claim 1 wherein said shutter carrier plate is a sector having a protruding rim on one face thereof, said rim having a gap therethrough.

5. Shutter mechanism as claimed in claim 4 wherein said shutter control member is a sector having an arcuate edge, a first portion of which lies at a given radius from the axis of rotation of said member, and having a second, indented portion adjacent said first portion which lies at a lesser radius from said axis than said first portion.

6. Shutter mechanism as claimed in claim 5 wherein said interlocking means includes a disk positioned in said indented portion and extending into said gap; and
   means for preventing said disk from exiting said gap.

7. Shutter mechanism as claimed in claim 6 wherein said means for retaining said disk in said gap includes a retainer plate having a arcuate track which track is positioned above said arcuate edge of said sector of said shutter carrier plate.

8. Shutter mechanism as claimed in claim 7 wherein said releasing means includes a notch in said arcuate track which notch being cooperatively sized to fully accept said disk; and
   means for retaining said disk in said gap.

9. Shutter mechanism as claimed in claim 8 wherein said means for retaining said disk in said notch includes the first portion of said arcuate edge of said sector of said shutter control member.

10. Shutter mechanism as claimed in claim 1 wherein said shutter plate is pivotably fixed to said shutter carrier plate by means of a pivot arm.

11. Shutter mechanism as claimed in claim 10 wherein the end of said arm distal from said shutter plate contacts a ramp protrusion extending from one face of said shutter control member only during said second portion of said rotation.

* * * * *